United States Patent

[11] 3,553,444

[72] Inventor Peter P. Tong
Madison, Wis.
[21] Appl. No. 742,019
[22] Filed July 2, 1968
[45] Patented Jan. 5, 1971
[73] Assignee T & T Technology, Inc.
a corporation of Wisconsin

[54] ABSORBANCE AND CONCENTRATION COMPUTER
48 Claims, 6 Drawing Figs.
[52] U.S. Cl.................................................235/151.35,
235/183, 235/197, 356/96
[51] Int. Cl.................................................G06f 15/20
[50] Field of Search.........................................235/183,
184, 193, 197, 92, 151.35; 307/293, 246; 356/201

[56] References Cited
UNITED STATES PATENTS

| | | | |
|---|---|---|---|
| 3,104,331 | 9/1963 | Zinke........................... | 307/293X |
| 3,214,603 | 10/1965 | VonUrff........................ | 235/197X |
| 3,329,836 | 7/1967 | Pearlman et al.............. | 235/197X |
| 3,377,467 | 4/1968 | Staunton et al............... | 235/92 |
| 3,392,352 | 7/1968 | White........................... | 307/246X |
| 3,428,796 | 2/1969 | Martens et al................ | 235/151.35X |
| 3,444,362 | 5/1969 | Pearlman..................... | 235/197 |

Primary Examiner—Eugene G. Botz
Assistant Examiner—Felix D. Gruber
Attorney—Dressler, Goldsmith, Clement & Gordon ABSTRACT: A system which provides digital readout representative of the transmittance, absorbance and concentration characteristics of a sample which has been analyzed by a spectromittance of the sample. The system can be selectively operated to show the desired characteristic of the sample in digital form.

If the absorbance is to be displayed, the spectrophotometer output signal is fed through a circuit which provides a log function to convert the transmittance characteristic to an absorbance characteristic in accordance with Beer's law. The output signal of the log function circuit is fed to a digital system which includes an analogue to digital converter coupled to an averaging system. A timing control circuit including a selective delay circuit and a master flip-flop is utilized to control the output of the analogue to digital converter and the averaging system. The averaging system is coupled to a digital readout device for displaying the absorbance in digital form.

If the concentration characteristic of the sample is to be displayed, the output of the log function circuit is fed to a curvature control circuit. The curvature control circuit can act to modify the output of the log function circuit to correct for deviation from linearity of the output of the atomic absorption spectrophotometer if the sample has high absorbance. The output of the curvature control circuit is fed to the above-described digital system for displaying the concentration in digital form.

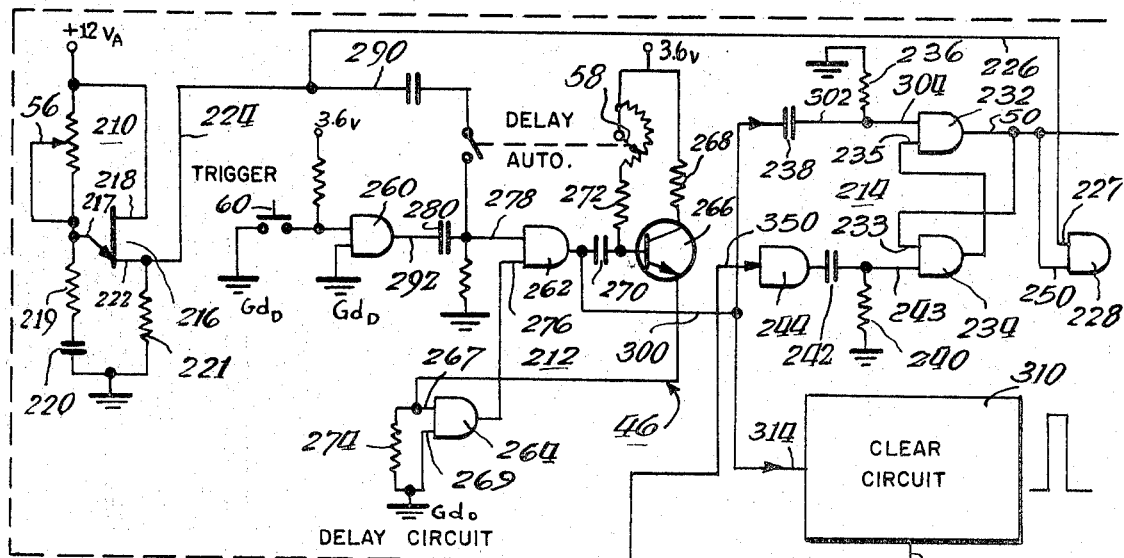
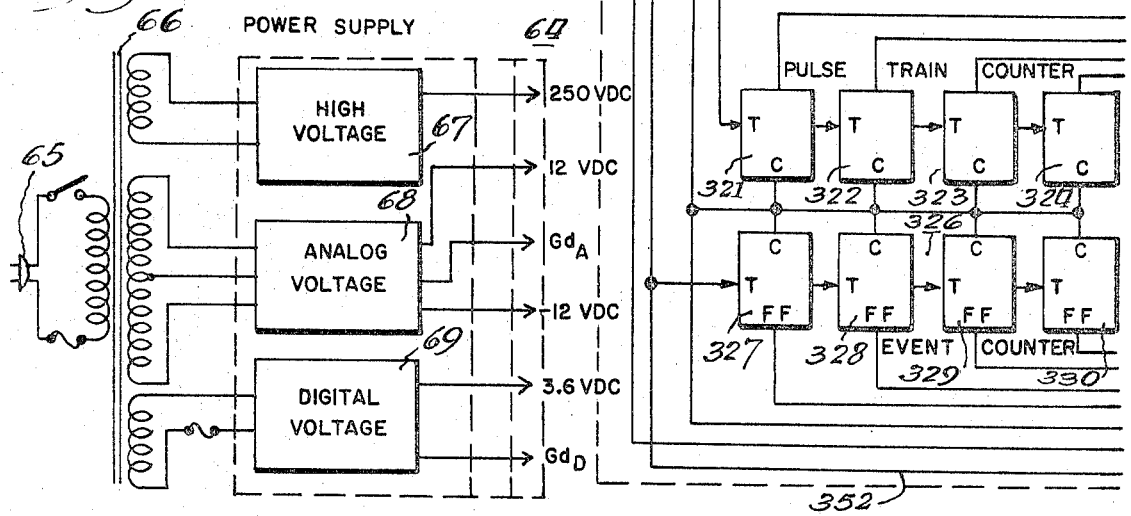
Fig. 2a
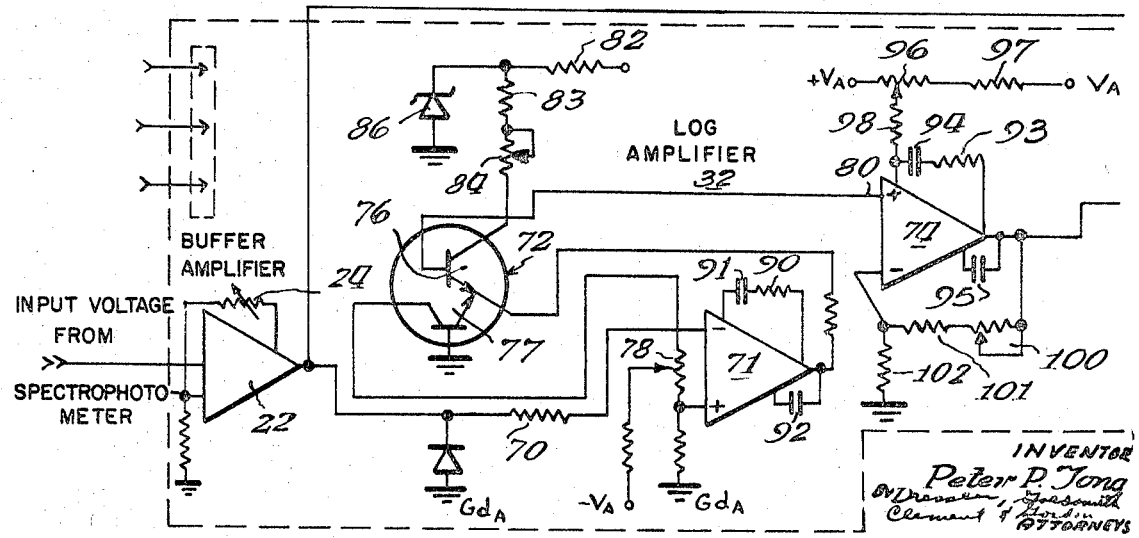

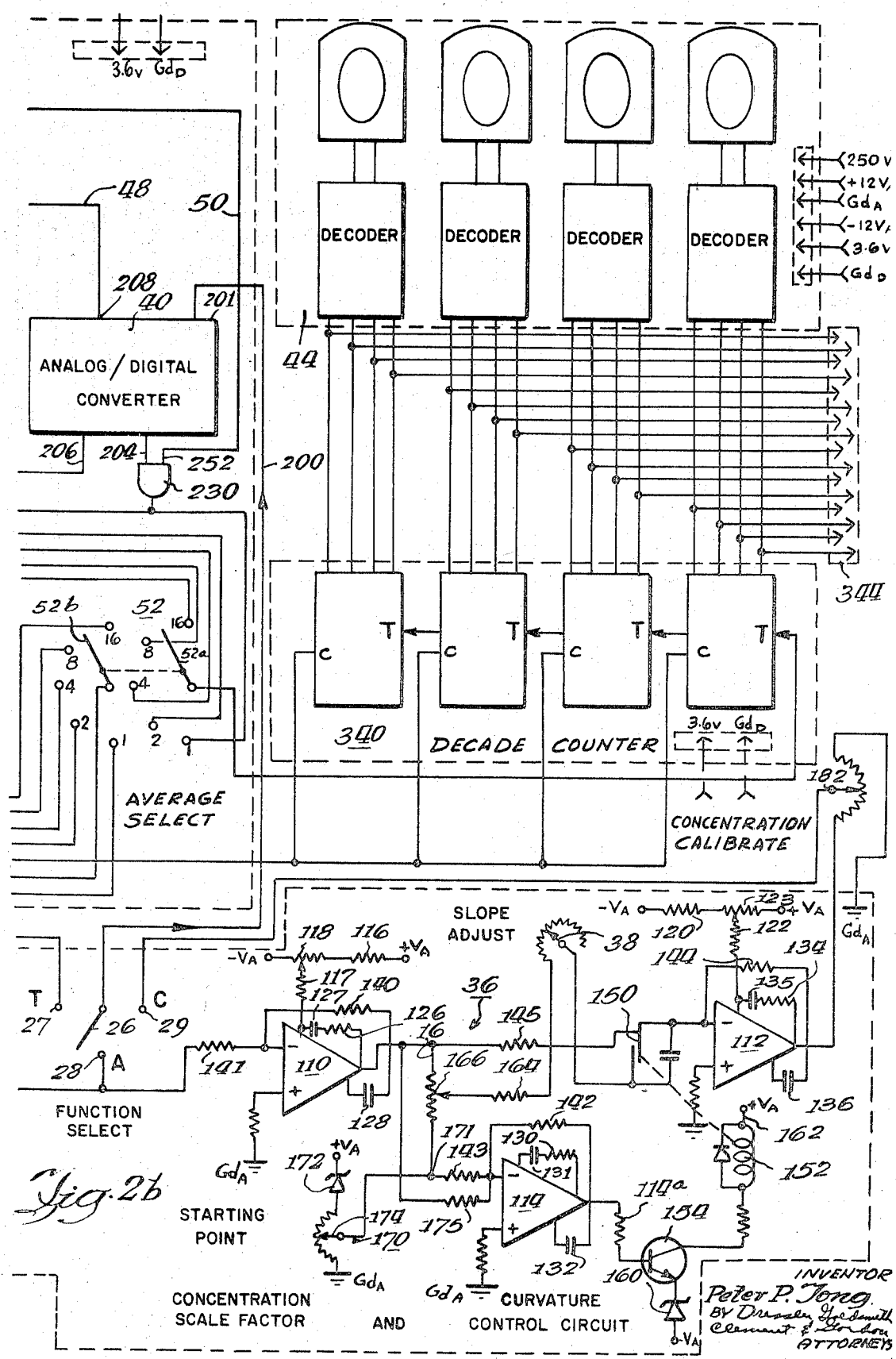

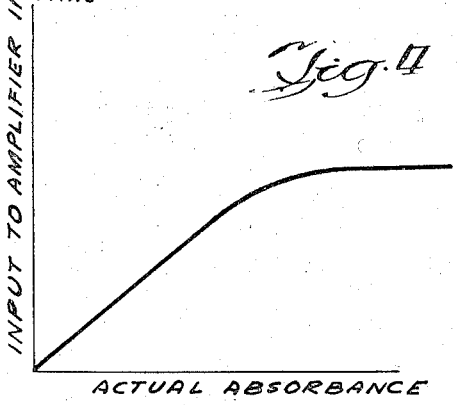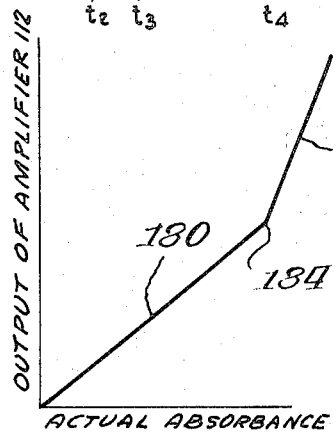

ABSORBANCE AND CONCENTRATION COMPUTER

This invention relates to a system for use in connection with, for example, an atomic absorption spectrophotometer having an output signal representative of the transmittance characteristics of a sample. The system of the present invention is utilized to provide, in a selective manner, a digital display representative of the transmittance, absorbance and concentration characteristics of the sample. As used herein, "sample" connotes anything that can be analyzed by a spectrophotometer.

The invention also concerns various circuits forming the total system. Such circuits include a display circuit, a circuit for controlling the characteristic graphical representation of the input voltage to the circuit as a function of the output voltage of the circuit, a circuit for computing the average value of a possibly variable function, a circuit for computing and displaying the absorbance characteristic of the sample, a circuit for computing and displaying the concentration characteristic of the sample and various combinations of the circuits mentioned above.

Manual computation of the concentration and absorbance characteristics of a sample following its transmittance analysis by an atomic absorption spectrophotometer is very time consuming and often results in inaccuracies. It is therefore desirable that a relatively economical and simple-to-operate computer be provided to present a rapid digital display of such concentration and absorbance characteristics.

In accordance with the illustrative embodiment of the present invention, a digital display system is provided for connection to the output of a spectrophotometer which has an output signal representative of the transmittance of a sample. The system includes an absorbance circuit for producing a logarithmic voltage output in response to a linear voltage applied thereto. Means are provided for applying the spectrophotometer output signal to the absorbance circuit. The logarithmic voltage output of the circuit is set to correspond to the absorbance of the sample in accordance with Beer's law of absorption.

A curvature control circuit is coupled to and controls the output of the absorbance circuit in order to provide an output signal representative of the concentration characteristic of the sample. This circuit is sometimes referred to as "a circuit for controlling the characteristic graphical representation of the input voltage to the circuit" because the curvature control circuit is an analogue circuit, although the output of the circuit is connected to digital circuitry, not lineal recording apparatus.

The system further includes a dual-ramp integrating-type analogue to digital converter and means for selectively coupling the output of the absorbance circuit and the output of the curvature control circuit to the analogue-to-digital converter. An averaging circuit is coupled to the output of the analogue-to-digital converter for averaging a selected number of input signals to the analogue-to-digital converter. Timing means are provided for controlling the output of the analogue-to-digital converter and digital readout means are coupled to the averaging means for presenting a digital display representative of the selected absorbance or concentration characteristic of the sample.

In the illustrative embodiment of the invention, the analogue-to-digital converter provides a pulse train output with the train of pulses being proportional in number to the representative signal input. The converter also provides an output event signal when the train of pulses has been provided by the converter. The averaging circuit includes means for counting a selected number of times that an output event signal is provided, with the counting means providing a switching signal when a selective number of output event signals has been counted.

The averaging circuit further includes pulse train dividing means coupled to an output, of the analogue-to-digital converter for providing a number of pulses equal to a quotient with the train of pulses being the dividend and with the divisor being equal to the selected number of output event signals. The digital readout means are coupled to the pulse train dividing means so that the total number of pulses produced by the pulse train dividing means is displayed in digital form.

The output of the counting means is connected to the input of a flip-flop so that the state of the flip-flop will change upon the receipt of the switching signal from the counting means. Means are provided for coupling the flip-flop output to the analogue-to-digital converter so that the pulse train output is controlled by the flip-flop.

In the illustrative embodiment, the absorbance circuit includes a pair of matched transistors which are connected to provide a logarithmic relationship between the differential of their emitter to base voltages and their output collector current. The curvature control circuit includes switching means responsive to the level of the absorbance circuit output, and means responsive to the switching means for inserting a resistance in circuit between the absorbance circuit output and the output of the curvature control circuit.

The timing means of the illustrative embodiment includes a monostable multivibrator for selectively delaying the operation of the analogue-to-digital converter for a predetermined amount of time. The multivibrator delay circuit includes a first, second and third gate. Means are provided for supplying current to the first gate which is coupled to the second gate by a capacitor. Means are provided for supplying current to the second gate and for supplying charging current to the capacitor. The third gate is responsive to the current output of the second gate and is connected in a feedback circuit between the output of the second gate and the input of the first gate. The third gate acts to hold the first gate to block passage of current through the first gate until the capacitor reaches a predetermined charge.

A more detailed explanation of the invention is provided in the following description and is illustrated in the accompanying drawings, in which:

FIG. 1 is a block diagram of an absorbance and concentration computer according to the principles of the present invention;

FIG. 2a and FIG. 2b together comprise a schematic circuit diagram of the absorbance and concentration computer of FIG. 1, with FIG. 2a being the left-hand portion of the circuit and FIG. 2b being the corresponding right-hand portion of the circuit;

FIG. 3 is a voltage-versus-time chart showing the voltages at various portions of the circuit of FIGS. 2a and 2b at selected times;

FIG. 4 is a graph depicting the actual absorbance of a sample versus the absorbance as derived by the absorbance analogue circuit from the output of a typical spectrophotometer; and FIG. 5 is a graph showing the correction voltage characteristic provided by the curvature control circuit of the present invention.

Figure 1:
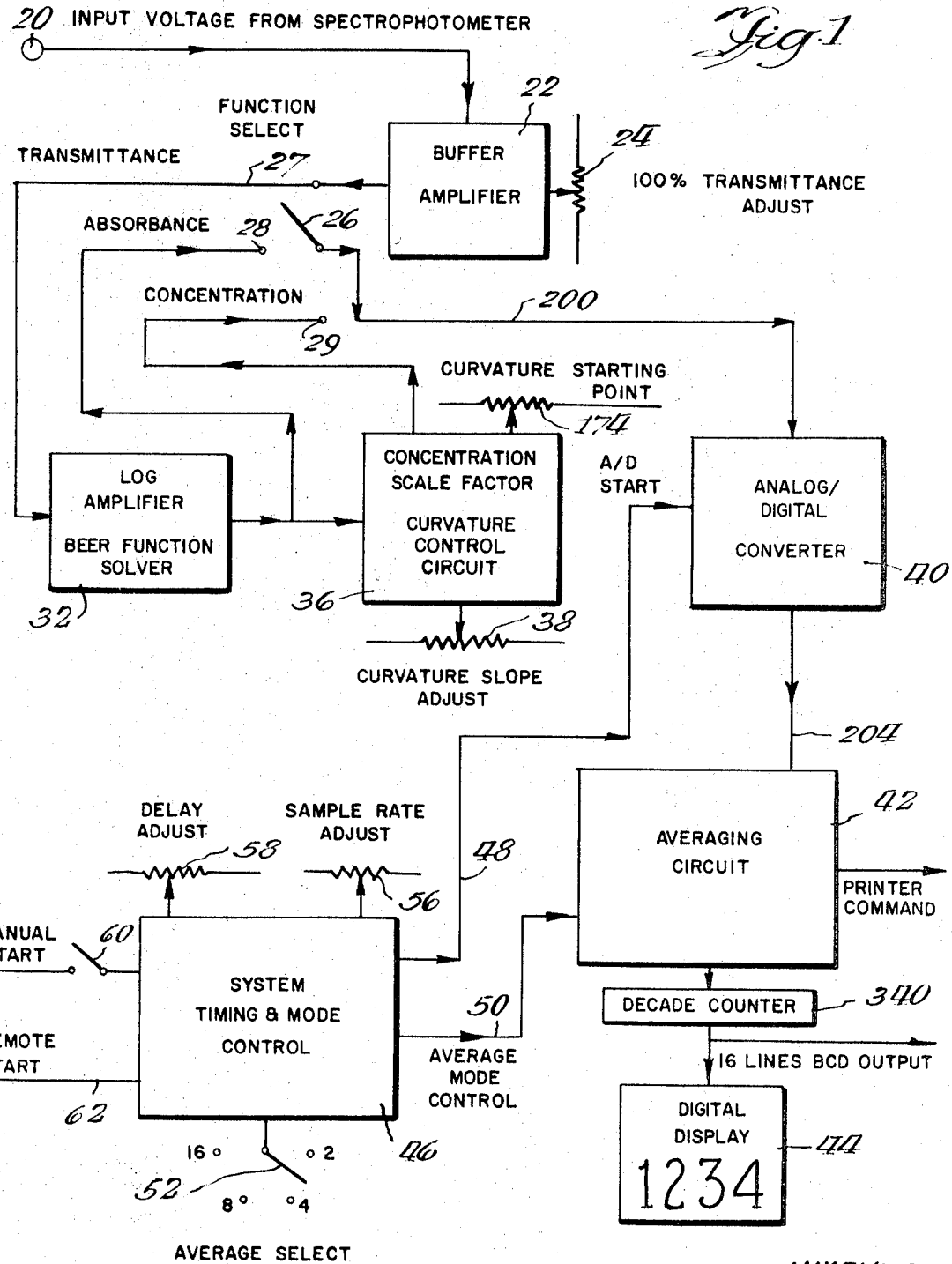

Referring to the block diagram of FIG. 1, the output of the spectrophotometer is connected at 20 and is fed to a buffer amplifier 22. The voltage at 20 is representative of the transmittance of the sample and a potentiometer 24 is provided to adjust the buffer amplifier output for proper operation of the system.

A three-way function selection switch 26 having contacts 27, 28 and 29 is provided to select the characteristic of the sample to be displayed in digital form. If the operator wishes to view the transmittance of the sample, switch arm 26 is moved to engage switch contact 27. The switch contact 27 is connected directly to the output of the buffer amplifier and the voltage at 27 is directly proportional to the input voltage from the spectrophotometer. If reading of the absorbance characteristic is desired, switch arm 26 is moved to engage contact 28 and if a reading as to the concentration of the sample is desired, the switch arm 26 is moved to engage contact 29.

The buffer amplifier 22 is coupled to a log amplifier 32 which provides a logarithmic function to correspond with Beer's Law of absorption. The log amplifier 32 utilizes a matched pair of transistors, as discussed in detail below, to provide a logarithmic output in response to the linear input representing the transmittance of the sample. The output of the log amplifier is coupled to contact 28.

The output of the log amplifier 32 is also coupled to a curvature control circuit 36. It has been found that samples having low transmittance characteristics are inaccurately represented by the spectrophotometer. With the typical atomic absorption spectrophotometer, after the absorbance of the sample reaches a predetermined level, the voltage output from the spectrophotometer does not correspond to a true Beer's Law function although it closely follows that function at lower absorbance levels. When samples having high-absorbance (low-transmittance) characteristics are analyzed, an operator who is manually calculating the concentration of the sample must do much extrapolating which is time consuming and often results in inaccuracies. The curvature control circuit 36 is utilized to control the output signal from the log amplifier 32 to provide an output at contact 29 which is properly characteristic of the concentration of the sample and which has been compensated for the error created during analysis of the high-absorbance sample.

The curvature control circuit 36 is provided with a curvature slope adjustment 38 for calibrating the proper error correction and with a curvature control starting point potentiometer 174 for setting the level at which the curve correction should begin. The output of the curvature control circuit is connected to contact 29.

The switch arm 26 is connected to an analoque-to-digital converter 40 which has its output coupled to an averaging circuit 42. The output of the averaging circuit is connected to a decade counter 340 which is coupled to a digital display 44 which provides digital readout corresponding to the elected characteristic of the sample.

A system timing and mode control circuit 46 is provided, and has an output 48 coupled to an input of the analogue-to-digital converter 40 for providing a signal to initiate the operation of the analogue-to-digital converter.

The averaging circuit is used for averaging a selected number of input signals to the analogue-to-digital converter. Line 50 from the output of the system timing and mode control circuit 46 is fed to the averaging circuit so that a number of input signals selected by the operator by moving the arm 52 of the average select switch will be operated upon in computing an average signal to be fed from the averaging circuit 42 to the decade counter 340 and therefore to the digital display unit 44. Line 48 from the output of the circuit 46 is fed to the analogue-to-digital converter 40 to accomplish an equivalent function, that is, to assure that the analogue-to-digital output is handled in accordance with the selected mode. Both lines 48 and 50 act to initiate the operation of their respective units.

The system timing and mode control circuit 46 includes a variable frequency pulse generator in which the frequency can be adjusted by variable resistor 56 and a delay circuit in which the length of the delay can be adjusted by a variable resistor 58. The system can be operated manually by trigger 60 or can be started remotely via line 62.

The more specific details of the circuitry of the illustrative embodiment of the present invention are set forth in the following discussion with reference to FIGS. 2a and 2b. It will be seen that the buffer amplifier 22, the log amplifier circuit 32 and the curvature control circuit 36 form an analogue system while the remaining circuits form a digital system. In this manner, a relatively inexpensive, lightweight and highly efficient system is provided.

The system power supply 64 is connected by plug 65 to a conventional power source (117 volts, 60 Hertz). The alternating current is fed through a transformer 66 and is rectified to provide a high DC voltage supply 67, an analogue DC voltage supply 68 and a digital DC voltage supply 69.

The input voltage from the spectrophotometer is typically between zero and 1 volt and is buffered by a potentiometric configuration operational amplifier 22 having at least 3 megohms input impedance to prevent any significant loading effect. The output of the buffer amplifier 22 is fed to a voltage-to-current converting resistance 70 which is coupled to an inverting amplifier 71. The inverting amplifier 71 is coupled to a matched transistor pair 72 which is connected to a potentiometric amplifier 74, to perform the log function calculation and yield the a absorbance analogue presentation.

Transistor pair 72 includes a first NPN transistor 76 and a second NPN transistor 77. The base and collector of the first transistor 76 are tied together and the emitters of the transistors are directly connected to each other. The base of the second transistor 77 is grounded and the collector of the second transistor is connected to a calibration potentiometer 78. The output of amplifier 71 is connected to the emitters of the transistors and the collector current of the first transistor 76 is fed to the input 80 of amplifier 74. Current is supplied to the base-collector of the first transistor 76 via resistors 82, 83 and variable resistor 84. A zener diode 86 is connected in parallel to the voltage source to provide voltage regulation.

Resistor 90 and capacitors 91 and 92 are connected to amplifier 71 for frequency compensation, that is, to filter out any sporadic noise signals well above the frequency range of the input, and to stabilize the amplifier. Likewise, resistor 93 and capacitors 94 and 95 are connected to amplifier 74.

A potentiometer 96 and resistors 97 and 98 are also connected to the amplifier 74 to provide offset adjustments. Potentiometer 96 can be varied so that a zero volt output is provided when there is a zero volt input. Also connected to amplifier 74 is a voltage multiplier comprising variable resistor 100 and fixed resistors 101 and 102. The function of the voltage multiplier is to adjust the gain of the amplifier and thereby calibrate for the known concentration.

The absorbance of a sample is logarithmically inversely proportional to its transmittance, in accordance with Beer's Law. To simulate the Beer log function for absorbance presentation, the transistor pair 72 is operational to prepare a logarithmic input voltage for amplifier 74 in response to a linear voltage function applied between the emitter and base of the second transistor 77. This function is accomplished because the differential of the base-to-emitter voltages of a pair of well-matched transistors is logarithmically proportional to their collector currents ratio.

The input voltage to the transistor pair from amplifier 71 is the differential base-to-emitter voltage between transistor 76 and 77 because the base of transistor 77 is grounded and the base of transistor 76 is tied to its own collector. The current in the collector of transistor 76 is adjusted by means of variable resistor 84 so that a fixed reference current can be easily established. The current in the collector of transistor 77 is controlled by the input voltage to the amplifier 71 which is connected in the inverting mode. The collector current of transistor 77 must be equal to the current in resistor 70 because of the current-summing nature of the amplifier 71.

The amplifier 74 presents a high impedance to the transistor pair 72 since it is a potentiometric amplifier. An appropriate output level from the amplifier 74 is controlled by a variable resistor 100, so that when the output signal is fed to a digital readout system, the digits presented will be representative of the absorbance of the sample.

The log amplifier 32 can be calibrated in the following manner. First, the buffer amplifier should be adjusted to present a 1 v. signal output. Variable resistor 84 is then adjusted so that the voltage at the collector of transistor 76 is zero. Potentiometer 98 is adjusted so that the voltage of the output of amplifier 74 is equal to zero. The buffer amplifier output voltage is then varied by transmittance adjust potentiometer 24 so that the output voltage of the buffer amplifier 22 is 100 mv. Variable resistor 100 is adjusted so that the output voltage of amplifier 74 is 1 v.

The buffer amplifier is adjusted so that 316 mv. is fed into amplifier 71. If the components are set properly, the output voltage of amplifier 74 should measure 500 mv. If 500 mv. is measured at the output of amplifier 74, the log amplifier 32 is properly calibrated.

If more than 500 mv. is measured at the output of amplifier 74, potentiometer 78 should be adjusted to increase the voltage at the output of amplifier 74 by the amount of error. For example, if the output voltage of amplifier 74 is 512 mv., the error voltage is 12 mv. The potentiometer 78 should then be adjusted so that the output voltage of amplifier 74 is 524 mv. Then, all of the calibration steps should be repeated and when 316 mv. is fed to the amplifier 71, the output of the amplifier 74 should be 500 mv.

If the voltage at the output of amplifier 74 is less than 500 mv., the potentiometer 74 should be adjusted to decrease the output voltage of amplifier 74 by the amount of error. For example, if the output voltage is 488 mv., there is a 12 mv. error and the potentiometer 78 should be adjusted so that the output voltage of amplifier 74 is equal to 476 mv. All of the calibration steps are again repeated and when 316 mv. is fed to the amplifier 71, the reading at the output of the amplifier 74 should be 500 mv. In this manner, the log amplifier 32 is properly calibrated to provide an output signal representative of the absorbance of a sample upon receiving from the spectrophotometer a signal representing the transmittance of the sample.

The concentration of a sample is directly proportional to the absorbance of the sample, and therefore the relationship between the absorbance and the concentration of a sample is linked by a variable gain DC amplifier 110. The amplifier 110 features an automatic gain change circuit by which, upon the input signal being at a level higher than a predetermined level, the overall amplifier gain can be modified to a new value without having any noticeable discontinuity or jump in the output. In this manner the operator can compensate for the nonlinearity which generally occurs, as discussed above, when the transmittance is less than 10 percent and the absorbance is very large.

Three operational amplifiers are used to perform the concentration calculation. The amplifier 110 is an inverting amplifier with its output connected to inverting amplifier 112 and a comparator 114.

Inverting amplifier 110 has an offset adjustment connected thereto comprising resistors 116, 117 and potentiometer 118. The offset adjustment connected to amplifier 112 includes resistors 120, 122 and potentiometer 123. Frequency compensation for amplifier 110 is provided by resistor 126 and capacitors 127 and 128. Frequency compensation to comparator 114 is provided by resistor 130 and capacitors 131 and 132. Frequency compensation to amplifier 112 is provided by resistor 134 and capacitors 135 and 136.

The gain of invertor 110 is determined in accordance with the ratio of resistors 140 and 141 while the gain of comparator 114 is determined in accordance with the ratio resistors 142 and 143, and the gain of amplifier 112 is determined in accordance with the ratio resistors 144 and 145. The resistance of resistor 142 is very high so that the gain of comparator 114 is relatively high, for example 2,200.

The output of amplifier 112 is also controlled in accordance with a circuit which is operative to place variable resistor 38 and resistor 164 in the input to amplifier 112 to thereby modify the voltage signal thereto. The variable resistor 38 can be connected to the input of amplifier 112 by relay contacts 150 which are opened and closed by means of a relay winding 152. The relay is operable in response to conduction of the transistor 154 having its base connected to the output of comparator 114 via resistor 114a and its emitter connected to the cathode of a zener diode 160, the anode of which is at a negative potential. A positive potential is applied to the terminal 162 of relay coil 152.

The variable resistor 38 is connected through resistance 164 to a potentiometer 166 which operates as a voltage divider. A reference voltage source 170 is connected to one end 171 of the voltage divider and includes a zener diode 172 having a positive potential applied to its cathode, and a potentiometer 174 with the arm connected to end 171 of the voltage divider. Resistor 175 is connected between the output of inverter 110 to which the other end 176 is also connected, and the input of comparator 114.

In order to correct for the nonlinear input signal to amplifier 110 which is illustrated in FIG. 4 and which results from spectrophotometer error with a high-absorbance sample, the control circuit is operable to provide a correction output signal from amplifier 112 which corresponds to the signal shown in graphical form in FIG. 5. The slope of portion 180 of the curve is adjusted by varying the resistance of potentiometer 182 which is connected to the output of amplifier 112. The point 184 at which the voltage output will be modified is set by starting point potentiometer 174. The slope of portion 186 of the curve is varied by means of slope adjust potentiometer 38.

The curvature control circuit operates as follows: Starting point potentiometer 174 is set so that point 184 of the curve will be assumed at a predetermined absorbance. When the voltage at the arm of the starting point potentiometer 174 is greater in absolute magnitude than the output of amplifier 110, the output of comparator 114 will be negative, forcing the transistor 154 to be reverse biased and therefore nonconductive. In this manner, the relay will not be actuated and the slope adjust variable resistor 38 will not be connected to the input of amplifier 112. The output of amplifier 112 at this time is linearly related to the input to amplifier 110.

When the voltage at the arm of starting point potentiometer 174 is lower in absolute magnitude than the output of the amplifier 110, the comparator 114 is driven positive and transistor 154 becomes conductive. This causes the relay to be actuated to close contacts 150 and introduce a new input to amplifier 112. This input is an algebraic sum of the starting point potentiometer voltage and the voltage at the output of amplifier 110. Potentiometer 166 provides additional balance so that when the output of amplifier 110 is equal in magnitude to the voltage at the arm of potentiometer 174, the effective input to amplifier 112 is virtually zero. In this manner, the possibility of having a discontinuity or jump upon closing of the contacts 150 is obviated.

By means of the curvature control circuit, the slope adjust variable resistor 38 is used to increase the overall gain of the amplifier 112. The concentration calibrate potentiometer 182 acts as a voltage divider which is a simple means of changing the output of amplifier 112 to meet the operator's requirement.

As stated above, the switch arm 26 is operable to engage contact 27 for transmittance reading, contact 28 for absorbance reading and contact 29 for concentration reading. Switch arm 26 is connected via line 200 to the input 201 of analogue-to-digital converter 40. The analogue-to-digital converter 40 is a conventional dual-ramp integrating type which provides an output to line 204 consisting of a pulse train proportional to the voltage input at 201. In other words, the number of pulses in the pulse train output reflects the input voltage, for example, 200 pulses in the pulse train being representative of an input voltage of 200 mv. at 201. The converter 40 also provides a signal to line 206 when the train of pulses is completed. The output of the converter 40 is connected to an averaging circuit, which will be explained in detail below.

The analogue-to-digital converter 40 generates an output in response to initiation or control signals at its input 208 via line 48. The control circuit 46 for the analogue-to-digital converter 40 includes a unijunction oscillator 210, a delay circuit 212 and a master flip-flop 214.

The oscillator 210 includes a unijunction transistor 216 with the sample rate adjust variable resistor 56 connected to the emitter 217 and the current supply directly connected to the base 218 of the unijunction transistor. The circuit also includes a resistor 219 and capacitor 220 connected to the emitter 217 and a resistor 221 connected to the base 222 of the transistor from which the output is fed via line 224 and line 226 to the input 227 of an AND gate 228. The output of AND gate 228 is fed via line 48 to the input 208 of the analogue-to-digital converter.

The unijunction oscillator output is gated by the master flip-flop 214 to initiate the analogue-to-digital conversion and is inhibited by the flip-flop when a predetermined number of analogue-to-digital conversions have taken place. The output of the master flip-flop 214 controls AND gates 228 and 230.

The master flip-flop is a conventional latch comprising an AND gate 232 having its output connected to the input 233 of AND gate 234 which has its output connected to the input 235 of AND gate 232. A resistor 236 and capacitor 238 are connected to the input 304 of AND gate 232 and a resistor 240 and capacitor 242 are connected to the input 243 of gate 234. A reset gate 244 has its output connected to the capacitor 242. When the master flip-flop 214 is set, the output at line 50, which is connected to input 250 of gate 228 and input 252 of gate 230, is low to provide an "AND" condition allowing the oscillator 210 to fire the converter 40.

There are two modes of control of the analogue-to-digital converter 40—"automatic" and "trigger" mode. In the automatic mode, the oscillator output is used to trigger the delay circuit 212 which, in turn, sets the master flip-flop 214. The oscillator is such that its pulse duration is longer than the maximum analogue-to-digital conversion time, and in this manner, the master flip-flop 214 can always be reset before the oscillator triggers again. The automatic mode is generally used in the calibration procedure.

In the manual initiation by closing switch 60 and the actual analoque-to-digital conversion initiation is created by delay circuit 212. The delay circuit can be adjusted for various lengths of time delay.

The delay circuit 212 includes AND gates 260, 262 and 264 and a darlington connection transistor 266 to form a long-duration monostable multivibrator. Current is fed to the collector of transistor 266 through resistor 268, and a capacitor 270 is coupled between the output of gate 262 and the base of transistor 266. Charging current to the capacitor is supplied through delay adjust variable resistor 58 and a resistor 272. The emitter of transistor 266 is connected to input 267 of gate 264 and to ground through a resistor 274. The other input 269 of gate 264 is connected directly to ground. The output of the gate 264 is connected to one of the inputs 276 of gate 262 and the other input 278 is coupled to the output of gate 260 through a capacitor 280.

In the initial state, gate 264 receives sufficient current from the transistor 266 to have its output at low or ground state. Since the output of gate 264 receives sufficient current from the transistor 266 to have its output at low or ground state. Since the output of gate 264 is connected to the input 276 of gate 262, the output of gate 262 is initially high. A trigger signal is applied to the input 278 of gate 262 by the unijunction oscillator 210 via line 290 or via line 292 by actuation of switch 60.

Upon receiving a trigger signal at input 278, the gate 262 goes low causing transistor 266 to go into a nonconductive state. When transistor 266 is not conductive, the gate 264, which is connected in feedback relationship between the transistor 266 and gate 262, will be starved thereby holding gate 262 low. The gates 262 and 264 cannot return to their respective initial states until transistor 266 becomes conductive by the charging of capacitor 270 through variable resistor 58 and resistor 272. The variable resistor 58 is set to provide a predetermined amount of charging time for the capacitor 270.

Input to set the master flip-flop 214 is a positive-going edge pulse which corresponds to the recovering transient or positive-going edge of the output of gate 262 which travels via line 300 and line 302 to the set input 304 of the gate 232.

A clear circuit 310 is also coupled to the output of gate 262 and is a capacitively coupled power inverter which emits a short duration pulse at its output 312 when a negative going pulse is fed to its input 314. The output pulse from the clear circuit 310 is used to clear all of the counters incorporated in the averaging system 42. The clearing of all of the counters takes place before any other function, and in this manner, the master flip-flop 214 cannot be set until the counters have been cleared.

The averaging circuit 42 comprises a pulse train binary counter 320 and an event binary counter 326. The pulse train binary counter consists of a 2-counter 321, a 4-counter 322, an 8-counter 323 and a 16-counter 324. The event binary counter consists of a 2-counter 327, a 4-counter 328, an 8-counter 329 and a 16-counter 330.

The output pulses from gate 230 are fed to an input of the pulse train counters via line 334. The output from clear circuit 310 is connected to the other inputs of the pulse train binary counter. The outputs of the pulse train counters are coupled through switch arm 52a to a decade counter 340 which is coupled to a digital display device 44 including decoders and digital display tubes. The binary-coded decimal output 344 of the decade counter can be coupled to other readout devices, if desired.

The analogue-to-digital complete signal output 206 is connected to an input of the event binary counter 326. The output of clear circuit 310 is connected to the other inputs of the counters forming the event binary counter, in order to clear the counters. A selected output of the counters 327 to 330 is connected through switch arm 52b, which is ganged to switch arm 52a, to the reset input 350 of the master flip-flop via line 352.

The average select switch 52, which includes switch arms 52a and 52b, is moved by the operator to select the number of signals to the input 201 of the analogue-to-digital converter 40 to be averaged.

For example, if there is to be no averaging, the switch arms are moved to the 1 contact which directly connects the output from gate 230 to the decade counter 340 and which directly connects the analogue-to-digital complete output 206 to the reset input 350 of the master flip-flop 214.

If, for example, an average of eight is selected, the switch arms 52a and 52b will be moved to engage the 8 contacts which will cause the 8-counter 323 to be connected to the decade counter 340 and the output of the 8-counter 329 of the event counter 326 is connected to the reset input 350 of the master flip-flop. In this manner, the output from gate 30 will be divided by eight by the averaging circuit and the number of pulses representing the quotient will be fed to the decade counter 340. The pulses will continue to be fed to the decade counter until a signal from the 8-counter 329 of the event counter 326 causes the master flip-flop to be reset thereby effectively cutting off the train of pulses from the analogue-to-digital converter. This will occur as soon as eight signals have been emitted from the analogue-to-digital complete output 206.

In effect, the analogue-to-digital conversion pulse train output is divided by eight before being connected to the input of the decade counter 340. Correspondingly, the master flip-flop will not be reset until the eighth analogue-to-digital conversion is completed. Using this technique, the final output of the decade counter 340 is equal to the average of eight successive samplings of inputs to the analogue-to-digital converter 40.

Referring to the pulse diagram of FIG. 3, it is seen that when a pulse is presented at time $t_1$ the input 278 of gate 262, the output of gate 262 becomes low from $t_1$ to $t_2$ until the capacitor 270 is charged enough to render transistor 266 conductive. Once the output signal of gate 262 becomes low (at $t_1$), an output pulse is provided by the clear circuit 310 at output 312 to clear all of the counters. When the output of gate 262 becomes high again (at $t_2$), the voltage at the input 250 of gate 228 will be lowered to ground while pulses are continuously applied to the input 227 of gate 228 from the oscillator 210. Gate 228 provides an output pulse at times $t_3$ and $t_5$, when its input at 250 is at ground and a pulse is at its input 227. The output pulse of gate 228 is an inverted pulse which sets the analogue-to-digital converter.

The analogue-to-digital complete signal at output 206 of the converter becomes low at $t_3$ and $t_5$, when a pulse is applied to input 208 to start the converter. The output at 206 remains low until the proper number of pulses are produced at the output 204. The selected event counter counts the number of times that the output at 206 is raised, for example at times $t_4$ and $t_6$. At the time ($t_4$) that the output at 206 is first raised indicating that a complete train of pulses has been emitted at output 204, the output of the selected counter is raised. When the selected counter has counted a predetermined number of times that the output at 206 is raised (at $t_6$), the output of the selected counter goes low. This is the signal causing the master flip-flop to be reset, terminating operation of the analogue-to-digital converter 40.

In the illustrative example, the operator has selected two samples for averaging. Therefore, the output at 206 of the analogue-to-digital converter will be raised twice before the output of 2-counter 327 of the event counter 326 is lowered to reset the master flip-flop. Hence, pulses are produced at the output 204 of the analogue-to-digital converter until the output at 206 is raised for the second time. The pulses provided at the output of gate 230 correspond to the inversion of the pulses at 204. These pulses are divided by the 2-counter 321 of the pulse of the train counter 320 so that one-half the amount of pulses at 204 are produced at the output of counter 321.

As stated above, the averaging operation will continue until the output of 2-counter 327 becomes low. This will not occur until two trains of pulses have been counted and when this does occur, the master flip-flop will be reset, causing the output of gate 228 to go to ground thereby signaling the analogue-to-digital converter 40 to terminate operation. All of the pulses from the output of 2-counter 321 of the pulse train counters 320 have been fed to the decade counter 340 and the number of pulses are read on the pulse readout device 44.

In effect, pulses representing two sample voltages at input 201 of the converter 40 are produced at the output 204 of the converter. The total number of pulses are effectively divided by two, thereby resulting in a computed average of the two samples.

Although no limitation is intended, the following is a specific example of some of the integrated circuits and other components that may be used in connection with the circuit illustrated in FIGS. 2a and 2b:

| Circuit elements | Model number |
| --- | --- |
| Transistor pair 72 | Fairchild MA726. |
| Amplifiers 22, 71, 74, 110, 112 and 114 | Fairchild MA709. |
| Gates 262 and 264 | Motorola MC724P. |
| Gates 260, 244, 232, 234, 228 and 230 | Motorola MC717P. |
| Clear circuit 310 | Motorola MC799P. |
| Counters, 321, 322, 323, 324, 327, 328, 329 and 330 | Motorola MC790P. |
| Decade counters 340 | Fairchild CuL9958. |
| Decoders of readout device 44 | Fairchild CuL9960. |

Although a specific embodiment of the present invention is described and illustrated, it is to be understood that various substitutions and modifications can be made by those skilled in the art without departing from the novel spirit and scope of the present invention;

I claim:

1. A system for computing the average value of a possibly variable function which comprises: an analogue-to-digital converter, means for actuating said converter to initiate flow of output pulses, means for providing to said converter a voltage representative of said function, said converter providing pulse train outputs with each train of pulses being proportional in number to the representative voltage input, said converter having means for providing an output event signal with the end of each pulse train, means for counting a selected number of times that an output event signal is provided, said counting means providing a switching signal when the selected number of output event signals has been counted, pulse train dividing means responsive to the output of said converter and responsive to the event signals for providing a number of pulses equal to a quotient with said train of pulses being the dividend and with the divisor being equal to said selected number of output event signals, gating means for receiving said switching signal and operating to terminate flow of pulses, and digital readout means coupled to said pulse train dividing means whereby the total number of pulses produced by said pulse train dividing means is displayed in digital form.

2. A system for computing the average value of a possibly variable function as described in claim 1, in which said pulse train dividing means is a first binary-counting device comprising a first 2-counter, a first 4-counter, a first 8-counter and a first 16-counter; and said counting means is a second binary-counting device comprising a second 2-counter, a second 4-counter, a second 8-counter and a second 16-counter.

3. A system for computing the average value of a possibly variable function as described in claim 2, including first switching means for selectively coupling a first counter to said digital readout means, and second switching means for selectively coupling a second corresponding counter to said switching signal-receiving means.

4. A system for computing the average value of a possibly variable function as described in claim 2, including means for clearing said first and second binary counting devices.

5. A system for computing the average value of a possibly variable function as described in claim 1 wherein said switching signal-receiving means comprises a flip-flop, the output of said counting means being connected to an input of said flip-flop whereby the state of said flip-flop will change upon receipt of said switching signal, and means coupling the flip-flop output to said analogue-to-digital converter whereby said pulse train output is controlled by said flip-flop.

6. A system for computing the average value of a possibly variable function as described in claim 5, in which said pulse train dividing means is a first binary-counting device comprising a first 2-counter, a first 4-counter, a first 8-counter and a first 16-counter; and said counting means is a second binary-counting device comprising a second 2-counter, a second 4-counter, a second 8-counter and a 16-counter.

7. A system for providing selective output signals representative of the absorbance and concentration characteristics of a sample which has been analyzed by a spectrophotometer having an output signal representative of the transmittance of the sample, which comprises: amplifier means for producing a logarithmic voltage output in response to a linear input voltage applied thereto, means for applying said spectrophotometer output signal to said amplifier means, first variable resistance means for modifying an input signal thereto, means coupling said variable resistance means to the output of said amplifier means, said coupling means comprising a circuit for controlling the graphical representation of the output voltage of said amplifier means, said circuit including means for providing a reference potential, means for comparing said amplifier means output voltage with said reference potential, switching means coupled to the output of said comparing means, and second variable resistance means connected to said switching means and adapted for insertion in said circuit in response to actuation of said switching means whereby the output voltage of said control circuit is modified in response to a predetermined relationship between said output voltage of said amplifier means and said reference potential, and means for selectively coupling said amplifier means output and the output of said amplifier means output and the output of said variable resistance means to a readout device.

8. A system for providing selective output signals representative of the absorbance and concentration characteristics of a sample which has been analyzed by a spectrophotometer having an output signal representative of the transmittance of the sample as described in claim 7, in which said selective coupling means includes a first switch contact connected to said amplifier means output, a second switch contact connected to the output of said first variable resistance means, and a switch for selective engagement with one of said first switch contact and said second switch contact.

9. A system for providing selective output signals representative of the absorbance and concentration characteristics of a sample which has been analyzed by a spectrophotometer having an output signal representative of the transmittance of the sample as described in claim 7, in which said amplifier means comprises a matched pair of transistors which are connected to provide a logarithmic relationship between the differential of their emitter to base voltages and their output collector currents.

10. A system for providing selective output signals representative of the absorbance and concentration characteristics of a sample which has been analyzed by a spectrophotometer having an output signal representative of the transmittance of the sample as described in claim 9, in which said switching means includes a transistor the base of which is coupled to the output of said comparing means whereby the output current of said transitor is responsive to the output of said comparing means, a relay the contacts of which are actuable in response to the output current of said transistor, said second variable resistance means being connected to said relay contacts and adapted for insertion in said circuit in response to actuation of said relay contacts.

11. A system for providing selective output signals representative of the absorbance and concentration characteristics of a s ample which has been analyzed by a spectrophotometer having an output signal representative of the transmittance of the sample as described in claim 7, in which said amplifier means comprises a first transistor and a second transistor, the emitter of said first transistor being directly connected to the emitter of said second transistor, the base of said first transistor being directly connected to the collector of said first transistor, the base of said second transistor being connected to ground, means for coupling said spectrophotometer output to the emitters of said transistors, and output modifying means coupled to the collector of said first transistor, the current in the collector of said first transistor having a logarithmic relationship with respect to the base to emitter voltage of said second transistor.

12. A system for providing selective output signals representative of the of the absorbance and concentration characteristics of a sample which has been analyzed by a spectrophotometer having an output signal representative of the transmittance of the sample as described in claim 7, in which said switching means includes a transistor the base of which is coupled to the output of said comparing means whereby the output current of said comparing means, a relay the contacts of which are actuable in response to the output current of said transistor, said second variable resistance means being connected to said relay contacts and adapted for insertion in said circuit in response to actuation of said relay contacts.

13. A system for providing selective output signals representative of the absorbance and concentration characteristics of a sample which has been analyzed by a spectrophotometer having an output signal representative of the transmittance of the sample as described in claim 12, including a zener diode connected in the emitter circuit of said transistor, said transistor enabling passage of sufficient current to energize said relay when the output voltage of said comparing means is sufficient to provide the breakdown voltage of said zener diode.

14. A system for providing selective output signals representative of the absorbance and concentration characteristics of a sample which has been analyzed by a spectrophotometer having an output signal representative of the transmittance of the sample, as described in claim 7, wherein said readout device includes an analogue-to-digital converter, means for actuating said converter to initiate flow of output pulses, said selective coupling means being connected to an input of said converter, said converter providing pulse train outputs with each train of pulses being proportional in number to the representative voltage input from said selective coupling means, said converter having means for providing an output event signal with the end of each pulse train, means for counting a selected number of times that an output event signal is provided, said counting means providing a switching signal when the selected number of output event signals has been counted, pulse train dividing means responsive to the output of said converter and responsive to the event signals for providing a number of pulses equal to a quotient with said train of pulses being the dividend and with the divisor being equal to said selected number of output event signals, gating means for receiving said switching signal and operating to terminate flow of pulses, and digital readout means coupled to said pulse train dividing means whereby the total number of pulses produced by said pulse train dividing means is displayed in digital form.

15. A system for providing selective output signals representative of the absorbance and concentration characteristics of a sample which has been analyzed by a spectrophotometer having an output signal representative of the transmittance of the sample, as described in claim 14, wherein said switching signal receiving means comprises a flip-flop, the output of said counting means being connected to an input of said flip-flop whereby the state of said flip-flop will change upon receipt of said switching signal, and means coupling the flip-flop output to said analogue-to-digital converter whereby said pulse train output is controlled by said flip-flop.

16. A system for providing selective output signals representative of the absorbance and concentration characteristics of a sample which has been analyzed by a spectrophotometer having an output signal representative of the transmittance of the sample, as described in claim 15, in which said amplifier means comprises a pair of matched transistors which are connected to provide a logarithmic relationship between the differential of their emitter to base voltages and their output collector currents.

17. A system for providing selective output signals representative of the absorbance and concentration characteristics of a sample which has been analyzed by a spectrophotometer having an output signal representative of the transmittance of the sample as described in claim 14, in which said pulse train dividing means is a first binary-counting device comprising a first 2-counter, a first 4-counter, a first 8-counter and a first 16-counter; said counting means is a second binary-counting device comprising a second 2-counter, a second 4-counter, a second 8-counter, and a second 16-counter.

18. A system for providing selective output signals representative of the absorbance and concentration characteristics of a sample which has been analyzed by a spectrophotometer having an output signal representative of the transmittance of the sample as described in claim 14, in which said logarithmic means comprises a pair of matched transistors which are connected to provide a logarithmic relationship between the differential of their emitter to base voltages and their output collector current.

19. A system for providing selective output signals representative of the absorbance and concentration characteristics of a sample which has been analyzed by a spectrophotometer having an output signal representative of the transmittance of the sample as described in claim 14, in which said switching means includes a transistor the base of which is coupled to the output of said comparing means whereby the output current of said transistor is responsive to the output of said comparing means, a relay the contacts of which are actuable in response to the output current of said transistor, said second resistance means being connected to said relay contacts and adapted for insertion in said circuit in response to actuation of said relay contacts.

20. A system for providing output indicia representative of the absorbance characteristic of a sample which has been analyzed by a spectrophotometer having an output signal representative of the transmittance of the sample, which comprises: amplifier means for producing a logarithmic voltage output in response to a linear input voltage applied thereto, means for applying said spectrophotometer output signal to said logarithmic means, means for modifying the voltage output of said amplifier means, output indicia means for enabling viewing of a representation of said modified output voltage, said output indicia means having a first input and a second input and being operable to produce the desired output only when a predetermined signal is provided at said first input means for coupling said modified output voltage to said second input, means for providing said predetermined signal at said first input; and a delay circuit coupling said predetermined signal providing means to said first input.

21. A system for providing output indicia representative of the absorbance characteristic of a sample which has been analyzed by a spectrophotometer having an output signal representative of the transmittance of the sample as described in claim 20, wherein said delay circuit comprises first second and third gate means, means for supplying current to said first gate means, said first gate means being coupled to said second gate means by a capacitor, means for providing current to said second gate means, means for supplying charging current to said capacitor, said third gate means being responsive to the current output of said second gate means and being connected in a feedback circuit between the output of said second gate means and the input of said first gate means, said third gate means acting to hold said first gate means to block passage of current through said first gate means until said capacitor reaches a predetermined charge, the output of said first gate means being coupled to said first input.

22. A system for providing output indicia representative of the absorbance characteristic of a sample which has been analyzed by a spectrophotometer having an output signal representative of the transmittance of the sample as c described in claim 21, in which said amplifier means comprises a matched pair of transistors which are connected to provide a logarithmic relationship between the differential of their emitter to base voltages and their output collector currents.

23. A system for providing output indicia representative of the absorbance characteristic of a sample which has been analyzed by a spectrophotometer having an output signal representative of the transmittance of the sample as described in claim 21, in which said first gate means comprises a first AND gate, said second gate comprising a transistor the base of which is coupled to the output of said first AND gate by a capacitor, the output of said third gate means being connected to one of the inputs of said first gate.

24. A system for providing output indicia representative of the absorbance characteristic of a sample which has been analyzed by a spectrophotometer having an output signal representative of the transmittance of the sample as described in claim 20, in which said amplifier means comprises a matched pair of transistors which are connected to provide a logarithmic relationship between the differential of their emitter to base voltages and their output collector currents.

25. A system for providing output indicia representative of the absorbance characteristic of a sample which has been analyzed by a spectrophotometer having an output signal representative of the transmittance of the sample, as described in claim 24, wherein said output indicia means includes an analogue-to-digital converter having said first input and said second input.

26. A system for providing output indicia representative of the absorbance characteristic of a sample which has been analyzed by a spectrophotometer having an output signal representative of the transmittance of the sample, as described in claim 20, in which said amplifier means comprises a first transistor and a matched second transistor, the emitter of said first transistor being directly connected to the emitter of said second transistor, the base of said first transistor being directly connected to the collector of said first transistor, the base of said second transistor being connected to ground, means for coupling said spectrophotometer output signal to the emitters of said transistors, and said voltage output-modifying means being coupled to the collector of said first transistor, the current in the collector of said first transistor being logarithmically proportional to the differential of the base to emitter voltages of both transistors.

27. A system for providing output indicia representative of the absorbance characteristic of a sample which has been analyzed by a spectrophotometer having an output signal representative of the transmittance of the sample as described in claim 20, wherein said output indicia means includes an analogue-to-digital converter having said first input and said second input.

28. A system for providing output indicia representative of the absorbance characteristic of a sample which has been analyzed by a spectrophotometer having an output signal representative of the transmittance of the sample as described in claim 20, wherein said output indicia means include an analogue-to-digital converter, means for actuating said converter to initiate flow of output pulses, said converter providing pulse train outputs with each train of pulses being proportional in number to the representative voltage input from said predetermined signal providing means, said converter having means for providing an output event signal with the end of each pulse train, means for counting a selected number of times that an output event signal is provided, said counting means providing a switching signal when the selected number of output event signals has been counted, pulse train dividing means responsive to the output of said converter and responsive to the event signals for providing a number of pulses equal to a quotient with said train of pulses being the dividend and with the divisor being equal to said selected number of output event signals, gating means for receiving said switching signal and operating to terminate flow of pulses, and digital readout means coupled to said pulse train dividing means whereby the total number of pulses produced by said pulse train dividing means is displayed in digital form.

29. A system for providing output indicia representative of the absorbance characteristic of a sample which has been analyzed by a spectrophotometer having an output signal representative of the transmittance of the sample as described in claim 28, wherein said switching signal receiving means comprises a flip-flop, the output of said counting means being connected to an input of said flip-flop whereby the state of said flip-flop will change upon receipt of said switching signal, and means coupling the flip-flop output to said analogue-to-digital converter whereby said pulse train output is controlled by said flip-flop.

30. A system for providing output indicia representative of the absorbance characteristic of a sample which has bee n analyzed by a spectrophotometer having an output signal representative of the transmittance of the sample as described in claim 28, in which said amplifier means comprises a pair of matched transistors which are connected to provide a logarithmic relationship between the differential of their emitter to base voltages and their output collector currents.

31. A system for providing selective output signals representative of the absorbance and concentration characteristics of a sample which has been analyzed by a spectrophotometer having an output signal representative of the the transmittance of the sample, which comprises: amplifier means for producing a logarithmic voltage output in response to a linear input voltage applied thereto, means for applying said spectrophotometer output signal to said amplifier means, first resistance means for modifying an input signal thereto coupled to the output of said logarithmic means, means coupling said first resistance means to the output of said amplifier means, said coupling means comprising a circuit for controlling the graphical representation of the output voltage of said logarithmic means, said circuit including means for providing a reference potential, means for comparing said amplifier means output voltage with said reference potential, switching means responsible to the output of said comparing means, and second resistance means connected to said switching means and adapted for insertion in said circuit in response to actuation of said switching means whereby the output voltage of said coupling circuit means is modified in response to a predetermined relationship between said output voltage of said amplifier means and said reference potential, output indicia means for enabling viewing of a representation of a selected output signal, said output indicia means having a first input and a second input and being operable to produce the desired output only when a predetermined signal is provided at said first input, means for selectively coupling said amplifier means output and the output of said first resistance means to said second input, means for providing said predetermined signal to said first input, and a delay circuit coupling said predetermined signal providing means to said first input.

32. A system for providing selective output signals representative of the absorbance and concentration characteristics of a sample which has been analyzed by a spectrophotometer having an output signal representative of the transmittance of the sample, as described in claim 3, in which said delay circuit comprises first, second and third gate means, means for supplying current to said first gate means, said first gate means being coupled to said second gate means by a capacitor, means for providing current to said second gate means, means for supplying charging current to said capacitor, said third gate means being responsive to the current output of said second gate means and being connected in a feedback circuit between the output of said second gate means and the input of said first gate means, said third gate means acting to hold said first gate means to block passage of current through said first gate means until said capacitor reaches a predetermined charge, the output of said first gate means being coupled to said first input.

33. A system for providing selective output signals representative of the absorbance and concentration characteristics of a sample which has been analyzed by a spectrophotometer having an output signal representative of the transmittance of the sample as described in claim 32, wherein said output indicia means includes an analogue-to-digital converter having said first input and said second input.

34. A system for providing selective output signals representative of the absorbance and concentration characteristics of a sample which has been analyzed by a spectrophotometer having an output signal representative of the transmittance of the sample, as described in claim 31, in which said amplifier means comprises a matched pair of transistors which are connected to provide a logarithmic relationship between the differential of their emitter to base voltages and their output collector current.

35. A system for providing selective output signals representative of the absorbance and concentration characteristics of a sample which has been analyzed by a spectrophotometer having an output signal representative of the transmittance of the sample as described in claim 31, in which said switching means includes a transistor the base of which is coupled to the output of said comparing means whereby the output current of said transistor is responsive to the output of said comparing means, a relay the contacts of which are actuable in response to the output current of said transistor, said second resistance means being connected to said relay contacts and adapted for insertion in said circuit in response to actuation of said relay contacts.

36. A system for providing selective output signals representative of the absorbance and concentration characteristics of a sample which has been analyzed by a spectrophotometer having an output signal representative of the transmittance of the sample as described in claim 35, including a zener diode connected in the emitter circuit of said transistor, said transistor enabling passage of sufficient current to energize said relay only when the output voltage of said comparing means is sufficient to provide the breakdown voltage of said zener diode.

37. A system for providing selective output signals representative of the absorbance and concentration characteristics of a sample which has been analyzed by a spectrophotometer having an output signal representative of the transmittance of the sample as described in claim 31, wherein said output indicia means includes an analogue-to-digital converter having said first input and said second input.

38. A system for po providing digital readout representative of the absorbance characteristic of a sample which has been analyzed by a spectrophotometer having an output signal representative of the transmittance of the sample, which comprises: amplifier means for producing a logarithmic voltage output in response to a linear input voltage applied thereto, means for applying said spectrophotometer output signal to said amplifier means, means for modifying the voltage output of said amplifier means to provide an output signal representative of said absorbance characteristic, an analogue-to-digital converter, means for actuating said converter, said converter providing pulse train outputs with each train of pulses being proportional in number to said absorbance representative output signal, said converter having means for providing an output event signal with the end of each pulse train, means for counting a selected number of times that an output event signal is provided, said counting means providing a switching signal when the selected number of output event signals has been counted, pulse train dividing means responsive to the output of said converter and responsive to said event signals for providing a number of pulses equal to a quotient with said train of pulses being the dividend and with the divisor being equal to said selected number of output event signals, gating e means for receiving said switching signal and operating to terminate flow of pulses, and digital readout means coupled to said pulse train dividing means whereby the total number of pulses produced by said pulse train dividing means is displayed in digital form.

39. A system for providing digital readout representative of the absorbance characteristic of a sample which has been analyzed by a spectrophotometer having an output signal representative of the transmittance of the sample as described in claim 38, wherein said switching signal receiving means comprises a flip-flop, the output of said counting means being connected to an input of said flip-flop whereby the state of said flip-flop will change upon receipt of said switching signal, and means coupling the flip-flop output to said analogue-to-digital converter whereby said pulse train output is controlled by said flip-flop.

40. A system for providing digital readout representative of the absorbance characteristic of a sample which has been analyzed by a spectrophotometer having an output signal representative of the transmittance of the sample as described in claim 38, in which said amplifier means comprises a pair of matched transistors which are connected to provide a logarithmic relationship between the differential of their emitter to base voltages and their output collector currents.

41. A system for providing digital readout representative of the absorbance characteristic of a sample which has been analyzed by a spectrophotometer having an output signal representative of the transmittance of the sample as described in claim 38, in which said pulse train dividing means is a first binary-counting device comprising a first 2-counter, a first 4-counter, a first 8-counter and a first 16-counter; said counting means is a second binary-counting device comprising a second 2-counter, a second 4-counter, a second 8-counter and a second 16-counter.

42. A system for providing digital display representative of the absorbance and concentration characteristics of a sample which has been analyzed by a spectrophotometer having an output signal representative of the transmittance of the sample, which comprises: amplifier means for producing a logarithmic voltage output in response to a linear voltage applied thereto, means for applying said spectrophotometer output signal to said amplifier means, curvature control circuit means coupled to the output of said amplifier means for controlling the output of said amplifier means, an analogue-to-digital converter, means for selectively coupling said amplifier means output and the output of said curvature control circuit to said analogue-to-digital converter, said amplifier means output providing a signal representative of the absorbance of the sample and said curvature control circuit output providing a signal representative of the concentration of the sample, means coupled to the output of said analogue-to-digital converter for averaging a selected number of input signals to said analogue-to-digital converter, timing means for controlling the output of said analogue-to-digital converter, and digital readout means coupled to said averaging means for presenting said digital display.

43. A system for providing digital display representative of the absorbance and concentration characteristics of a sample which has been analyzed by a spectrophotometer having an output signal representative of the transmittance o of the sample as described in claim 42, said timing means including means for selectively delaying operation of said analogue-to-digital digital converter for a predetermined amount of time.

44. A system for providing digital display representative of the absorbance and concentration characteristics of a sample which has been analyzed by a spectrophotometer having an output signal representative of the transmittance of the sample as described in claim 42, in which said amplifier means comprises a pair of matched transistors which are connected to provide a logarithmic relationship between the differential of their emitter to base voltages and their output collector current.

45. A system for providing digital display representative of the absorbance and concentration characteristics of a sample which has been analyzed by a spectrophotometer having an output signal representative of the transmittance of the sample as described in claim 42, wherein said curvature control circuit means includes switching means responsive to the level of said amplifier means output and means coupled to said switching means for inserting a resistance in circuit between said amplifier means output and the output of said curvature control circuit.

46. A system for providing digital display representative of the absorbance and concentration characteristics of a sample which has been analyzed by a spectrophotometer having an output signal representative of the transmittance of the sample as described in claim 42, wherein said converter provides a pulse train output with the train of pulses being proportional in number to the representative signal input, said converter also providing an output event signal when said train of pulses has been provided by said converter, means for counting a selected number of times that an output event signal is provided, said counting means providing a switching signal when the selected number of output event signals has been counted, pulse train dividing means coupled to the output of said converter for providing a number of pulses equal to a quotient with said train of pulses being the dividend and with the divisor being equal to said selected number of output event signals, said digital readout means being coupled to said pulse train dividing means whereby the total number of pulses produced by said pulse train dividing means is displayed in digital form.

47. A system for providing digital display representative of the absorbance and concentration characteristics of a sample which has been analyzed by a spectrophotometer having an output signal representative of the transmittance of the sample as described in claim 46, wherein said switching signal receiving means comprises a flip-flop, the output of said counting means being connected to an input of said flip-flop whereby the state of said flip-flop will change upon receipt of said switching signal, and means coupling the flip-flop output to said analogue-to-digital converter whereby said pulse train output is controlled by said flip-flop.

48. A system for providing digital display representative of the absorbance and concentration characteristics of a sample which has been analyzed b a spectrophotometer having an output signal representative of the transmittance of the sample as described in claim 46, in which said pulse train dividing means is a first binary-counting device comprising a first 2-counter, a first 4-counter, a first 8-counter, and a first 16-counter; and said counting means is a second binary-counting device comprising a second 2-counter, a second 4-counter, a second 8-counter and a second 16-counter.

UNITED STATES PATENT OFFICE
CERTIFICATE OF CORRECTION

Patent No. 3,553,444                    Dated January 5, 1971

Inventor(s)           Peter P. Tong

It is certified that error appears in the above-identified patent and that said Letters Patent are hereby corrected as shown below:

In the Abstract, line 4, in the word "spectromittance" after "spectro" insert -- photometer generating an output signal representative of the trans --. Column 1, line 46, "analogue" should read -- analog --. Column 3, line 34, "elec" should read -- selected --. Column 4, line 7, after "the" can "a". Column 7, line 24, after "manual" insert -- trigger mode a time lag between the manual --; line 43, after "264" cancel "receives sufficient current from the transistor 266 to have its output at low or ground state. Since the output of gate 264". Column 8, line 37, "30" should read -- 230 --. Column 9 line 18, after "pulse" cancel "of the". Column 10, line 59, after "output" cancel "of said amplifier means output and the output". Column 11, line 36, after "of the" cancel "of the"; line 42, after "said" insert -- transistor is responsive to t output of said --. Column 13, line 24, after "as" cancel "c". Column 14, line 64, "responsible" should read -- responsive - Column 15, line 9, "3" should read -- 31 --. Column 16, line after "gating" cancel "e". Column 17, line 4, after "transmittance" cancel "o"; line 7, after "digital" cancel "digital". Column 18, line 26, "b" should read -- by --.

Signed and sealed this 8th day of June 1971.

(SEAL)
Attest:

EDWARD M. FLETCHER, JR.                WILLIAM E. SCHUYLER, JR
Attesting Officer                      Commissioner of Patents